United States Patent [19]
Wilson

[11] 4,162,709
[45] Jul. 31, 1979

[54] SOD HARVESTING SEVERING MEANS FOR FORMING AND ORIENTING INDIVIDUAL SOD PADS

[75] Inventor: Woodrow L. Wilson, Columbus, Ohio

[73] Assignee: Wilson-Miner R & D, Groveport, Ohio

[21] Appl. No.: 817,547

[22] Filed: Jul. 21, 1977

[51] Int. Cl.² ............................................. A01B 45/04
[52] U.S. Cl. ........................................ 172/20; 83/663; 83/678
[58] Field of Search ............... 172/20, 19; 83/300, 83/301, 302, 663, 673, 678

[56] References Cited
U.S. PATENT DOCUMENTS

| 127,235 | 5/1872 | Heywood | 83/302 X |
| 937,331 | 10/1909 | Reed | 83/663 |
| 2,735,488 | 2/1956 | Anderson et al. | 83/678 X |
| 3,887,013 | 6/1975 | Helberg | 172/20 |

Primary Examiner—Paul E. Shapiro
Attorney, Agent, or Firm—Francis T. Kremblas, Jr.

[57] ABSTRACT

An improved severing means facilitating the formation and handling of individual pads of sod for implementation with automated sod harvesting apparatus which comprises a rotary mounted set of spaced transversely extending blades cooperating with a longitudinally mounted blade means disposed between at least two of the transversely extending blades. This unique configuration provides means to form a plurality of individual pads of sod which upon each complete revolution of the severing means automatically orients contiguous sets of pads in a cross-wise manner to facilitate further handling of the pads.

11 Claims, 4 Drawing Figures

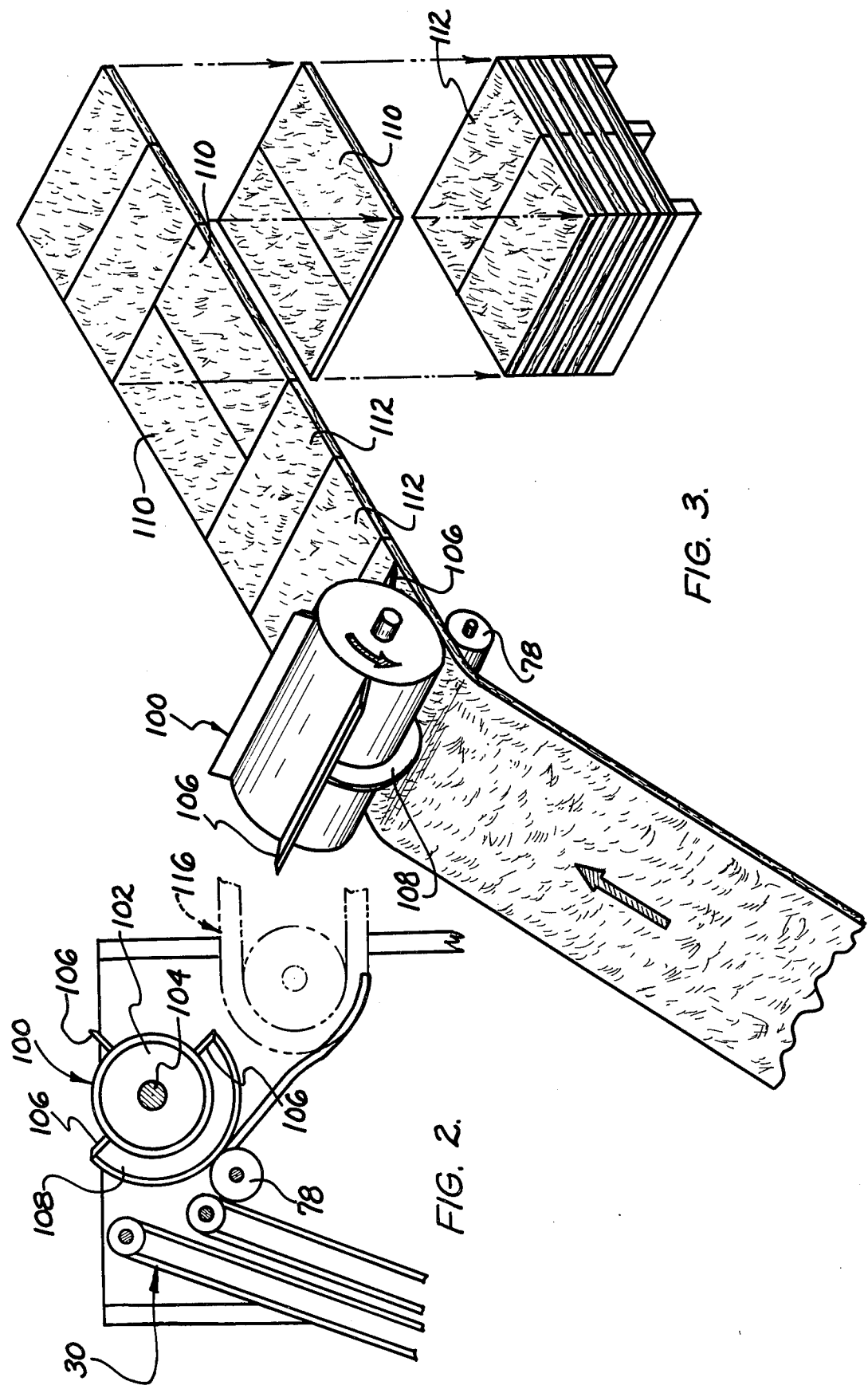

SOD HARVESTING SEVERING MEANS FOR FORMING AND ORIENTING INDIVIDUAL SOD PADS

BACKGROUND AND SUMMARY OF THE INVENTION

The cultivating of turf grass is a rapidly expanding industry in which the search for improved harvesting methods has been long and continuous. The awareness of the industry for increased automation to promote expanded production and reduce constantly increasing labor costs has over the last decade brought forth such apparatus such as described in U.S. Pat. Nos. 3,672,452 and 3,887,013.

Such prior apparatus represent efforts to increase production and quality while reducing the labor required, however, each still possesses disadvantages which require more manpower than desirable or rather complicated mechanisms to perform tasks otherwise performed by manual labor.

One of major unsolved problems in the prior art of sod harvesting equipment relates to the handling of the individual sod pads after being cut to the desired size. Most turf growers transport sod pads stacked upon pallets with alternate sets of pads orientated at right angles to provide stability to the stack resting upon the pallet.

This operation usually requires two men to handle the pads and cross-index them upon the pallet. U.S. Pat. No. 3,887,013 proposes rather expensive and complicated equipment to turn alternate pads prior to palleting, however, this does not represent a truly satisfactory solution, particularly in view of the present invention as disclosed herein.

The present invention relates generally to automated sod harvesting apparatus and particularly to an improved and unique sod pad severing means which not only severs the sod strip to form individual pads but also orients the pads in a manner which drammatically facilitates the stacking process.

The severing means of the present invention comprises a novel rotary frame such as a cylinder or drum upon which is mounted a plurality of transversely extending knife blades and a longitudinally extending knife blade. The blades are so arranged to make transverse and longitudinal cuts in the sod strip delivered to the severing means such that upon one complete rotation of the blades a plurality of individual sod pads are formed with alternate sets of individual pads automatically disposed in cross-wise fashion to facilitate palleting or similar handling.

Therefore in a very simple and inexpensive manner, the sod strips are formed and simultaneously assume the desired orientation to permit the desired stacked relationship.

No separate expensive or cumbersome equipment is necessary to turn alternate pads and proper automated stacking can be achieved in the simplest manner deemed appropriate.

OBJECTS OF THE INVENTION

It is a primary object of the present invention to provide a novel severing means adapted for use with automated sod harvesting apparatus which drammatically reduces the cost and labor required to harvest sod products.

Another object of the present invention is to provide a severing means of the type described which is of relatively simple construction and yet offers the dual function of forming individual sod pads of desired preselected size but also automatically orientates the formed sod pads in a manner which facilitates the further handling of the pads in a convenient and automated manner.

It is another object of the present invention to provide a severing means of the type described wherein a plurality of transverse cuts cooperate with at least one longitudinally cut on a strip of sod to sever said strip into individual pads of sod having preselected lengths and widths and preselected orientation merely by means of the manner in which the individual pads are cut or severed from one another without requiring additional apparatus or manual effort to accomplish the desired orientation.

It is a further object of the present invention to provide a novel severing means of the type described wherein a rotary drum or cylinder may be employed to carry blades selectively disposed to permit a plurality of individual sod pads of preselected widths, lengths and in preselected orientation to one another to be formed upon one complete revolution of the blades.

Other and further objects of the invention, together with the features of novelty appurtenant thereto, will appear in the course of the following description.

IN THE DRAWINGS OF THE INVENTION

FIG. 2 is a partial side elevational view of the apparatus shown in FIG. 1 illustrating the severing means of the present invention;

Figure 1:
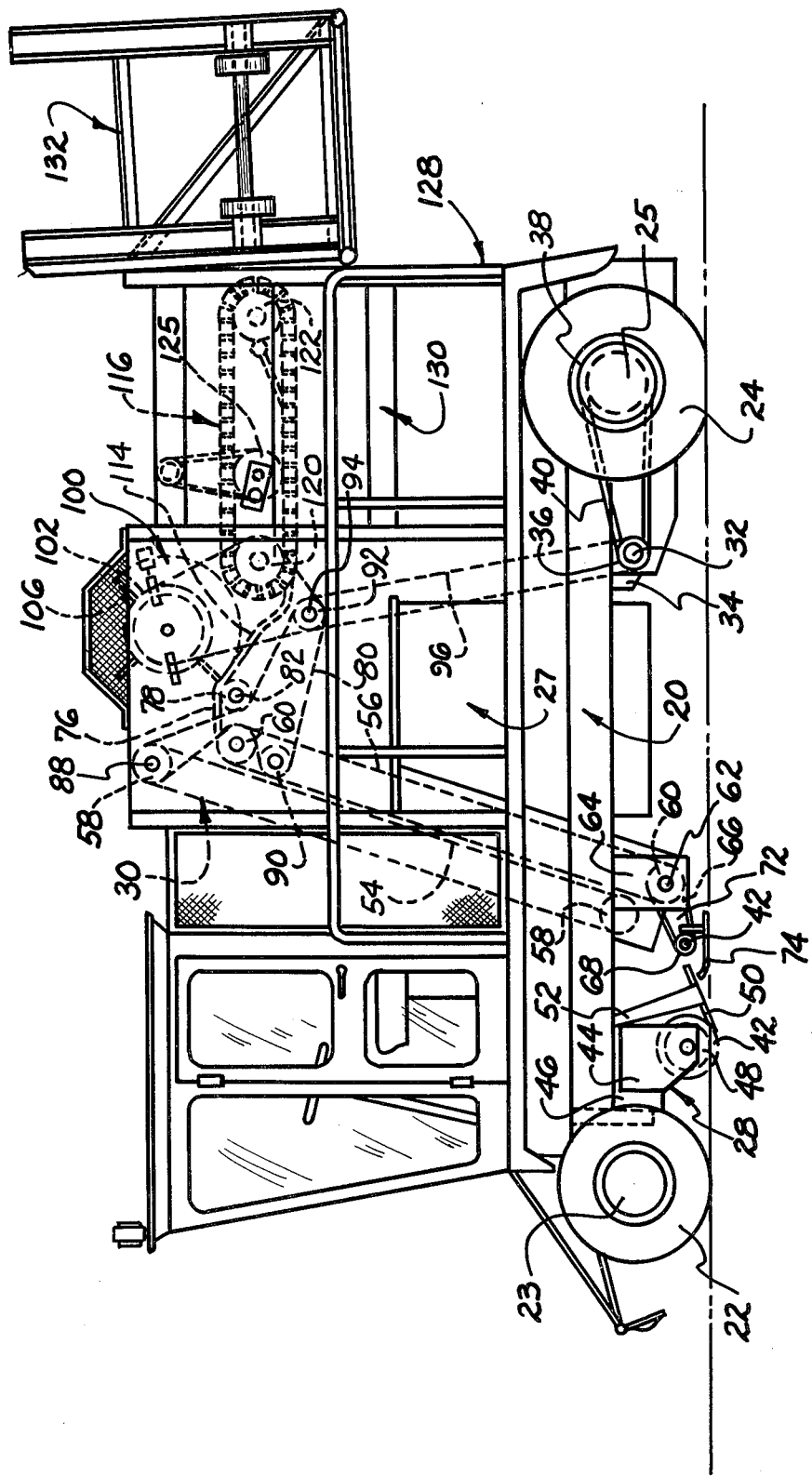
FIG. 1 is a side elevational view of a automatic sod harvesting apparatus typical of the type which advantageously may utilize the novel severing means and method of the present invention.
Figure 4:
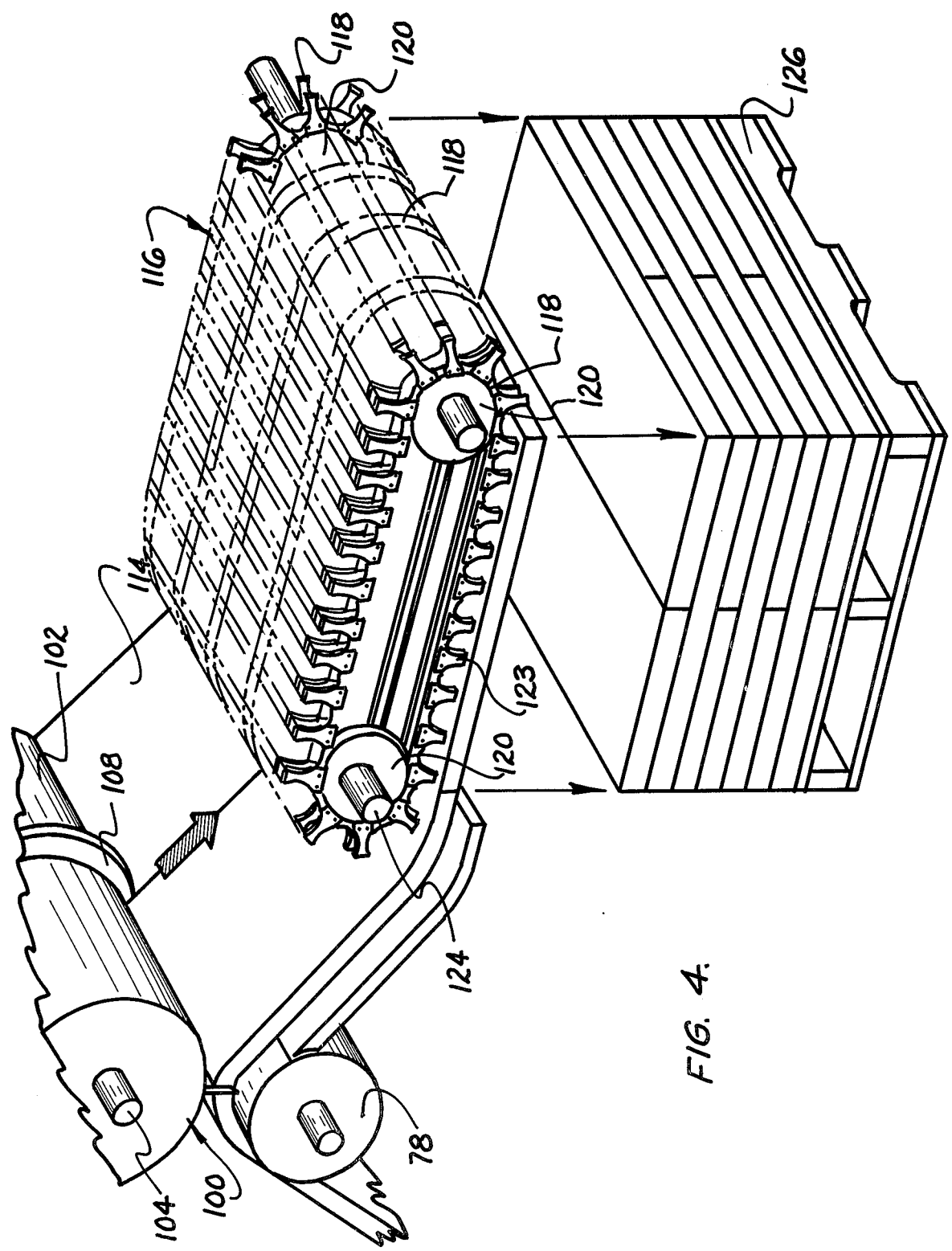

FIG. 3 is a perspective view of the novel severing means shown in the preceding Figures illustrating the novel cutting and orientation of the sod pads accomplished using the teachings of the present invention; and FIG. 4 is a partial perspective view of the apparatus shown in FIG. 1 illustrating a means for conveying and handling the sod pads cut and oriented by means of the present invention in an advantageous manner.

DETAILED DESCRIPTION OF THE INVENTION

Referring in detail to the drawings, an self-propelled automated sod harvesting apparatus is illustrated in FIG. 1 and is of a type which may advantageously incorporate the severing means of the present invention.

It should be pointed out that the present invention relates to novel severing means which may be adapted to various types of automated harvesters which include means to deliver or present a strip of sod to the severing means for cutting said strip into preselected lengths and widths.

Therefore the apparatus shown in FIG. 1 will only be briefly described herein for purposes of description and illustration and in no manner forms a portion of the present invention or a limitation thereof except as used in conjunction with the severing means as described in detail later herein.

Sod harvesters such as shown in FIG. 1 typically include a frame means indicated generally at 20, which is supported by suitable wheels such as at 22 and 24 mounted on appropriate front and rear axles such as 23 and 25 in a conventional manner. Suitable drive and steering means are conventionally provided and therefore need not be described in detail herein.

A cab compartment 26 is fixed and supported forwardly on frame means 20 for an operator and the suitable controls for the various operation and functions of the apparatus. The apparatus is usually furnished motive power conventionally by means of a diesel engine indicated generally at 27 which is mounted on frame means 20.

Preferably, a forwardly disposed sod strip cutting head indicated generally at 28, is employed which separates a strip of sod having a preselected width and depth from the ground and delivers the strip in a continuous manner to a elevator conveying system indicated generally at 30.

It should be noted that various known cutting heads and conveying systems may be employed with the present invention, such as that described in U.S. Pat. No. 3,672,452 or with variations of that type without departing from the spirit of the present invention.

In view of the many well-known means of separating sod strips from the ground and conveying them to a cutting station, a detailed description is believed unneccessary.

However, it should be pointed out that the severing means of the present invention could also be employed in other types of apparatus advantageously to harvest sod such as being disposed forwardly of a cutting head assembly, such as at 28, to prepare the strips for removal from the ground in a preselected configuration and orientation to one another.

It is believed the general type of apparatus shown and described herein represents the optimum method and means known at the present.

Still referring to FIG. 1, engine 27 drives a drive shaft 32 via a transmission 34 and is operatively connected to drive rear axle 25 and wheels 24 via sprockets 36 and 38 connected by chain 40.

Cutting head assembly 28 preferably is carried on frame 20 and includes a ground engaging drum 42 rotatably mounted between a pair of mounting plates 44. Plates 44 preferably are mounted on a carriage member 46 which is mounted for vertical movement on a frame to permit raising and lowering of the cutting head assembly.

Each end of drum 42 carries a disc-like cutter 48 to penetrate the sod and define the width of the strip of sod which is to be removed or stripped from the ground.

Cutting head assembly 28 also includes a laterally extending blade 50 provided with a sharp leading edge which is mounted on the lower end of a pair of downwardly extending arms 52. Preferably the upper end of arms 52 are pivotally mounted on frame 20 to permit oscillation of blade 50 to facilitate the separation of the sod strip from the ground defined by the width of disc cutters 48.

The elevator conveying assembly 32 preferably includes a pair of chain sets 54 and 56 which are adapted to receive the sod strip from the cutter head between them and carry the strip to the severing means indicated generally at 100.

The upper set of chains 54 are spaced apart and trained about pairs of sprockets 58 which in turn are rotatably mounted in frame 20.

In a like manner, the lower set of chains 56 are trained about sprockets 60. The lower set of sprockets 60 are mounted on a common shaft 62 which is rotatably connected to mounting plates such as at 64 which in turn are mounted to frame 20.

Sod cut by blade 50 is transferred to elevator assembly by means of a set of parallel chains 66 which are operatively mounted on a sprocket 68 and a larger sprocket, not shown, which is carried by shaft 62. Sprocket 68 is mounted on a shaft 70 which in turn is carried by a pair of arms 72 which are pivotally mounted and provided with skids 74 which ride along the ground in a manner to properly position chains 66.

Sod passing through the elevator assembly 30 is delivered onto a plurality of spaced plates 76 secured to frame 20 which are positioned to direct the sod to the upper surface of a cylindrical drum 78 rotatably mounted via shaft 82. A sprocket 84 is carried on one end of shaft 82 and receives a chain 80 which is operatively mounted around sprockets carried by shafts 86 and 88 which also carry sprockets 58 and 60.

Chain 80 also is mounted around an idler sprocket 90 and a sprocket 92 carried by a suitable shaft 94 which also carries another sprocket which is operatively connected to a sprocket carried by drive shaft 32 via a chain 96.

This interconnecting drive arrangement drives drum 78 in a clockwise direction as seen in FIG. 1 and preferably coordinates its rate of speed with the ground speed of the apparatus and therefore the rate of travel of the sod strip delivered via elevator assembly 30. A slight tension should be developed in the sod strip delivered from the cutting head and through the elevator assembly to prevent jamming of the strip as it is being harvested.

Referring now to FIGS. 2, 3 and 4, a novel sod strip severing means of the present invention, indicated at 100 comprises a rotary mounted cylindrical drum 102 mounted on a horizontal shaft 104 which in turn is supported on the main frame 20. Drum 102 rotates counterclockwise as seen in FIG. 1.

Drum 102 is provided with a plurality of outwardly projecting cutting blades 106 extending transversely to the direction of travel of the strip of sod being cut and at least one outwardly projecting blade 108 extending circumferentially relative to drum 102 and longitudinally relative to the direction of travel of the sod strip passing through the severing means.

Blades 106 are preferably spaced approximately equidistant from one another and blade 108 extends approximately half-way around the circumference of drum 102 between two adjacently disposed blades 106. Each of the blades are of sufficient length to completely sever the sod strip as it passes between each blade and drum 78 which functions as a rolling cutting mandrel closely spaced to the passage of the blades.

Blade 108 is preferably located midway between the ends of drum 102 to sever the sod strip in approximately half relative to its width. The distance between blades 106 is predicated on making transverse cuts spaced apart approximately equal to the one-half the width of the original sod strip entering the severing area.

As best seen as diagrammatically illustrated in FIG. 3, this arrangement of blades on drum 102 results inherently in one pair of side by side and generally rectangular shaped sod pads such as at 110 being alternately formed with a side by side oriented pair of sod pads such as at 112 of like rectangular configuration, but having their long axis aligned perpendicularly to the first pair 110. Therefore, the sod pads being formed are inherently cross-indexed for proper stacking upon being formed by severing means 100 and no manual labor or additional complex apparatus is needed to turn alternate sets of pads.

Preferably, the circumference described by the blades 106 and 108 upon rotation of drum 102 is adapted to equal twice the desired length of an individual sod pad such that upon one complete revolution of drum 108, four pads are formed having approximately equal lengths and widths.

From the foregoing description, however, it should be clear that by modifying the number of blades, their configuration, and/or their orientation, as well as the speed of rotation relative to rate of travel of the sod strip, many possible sizes and sod pad orientations are permitted using the teachings of the present invention.

For example, a strip of sod 40 inches wide delivered to the severing means is cut into two sets of side by side pads which are alternately cross-indexed in relation to their length and measure 20 by 40 inches. However, a 48 inch wide sod strip, using two blades 108, each spaced approximately one-third of the distance from each end of drum 102, would result in six pads aligned in two sets of three, cross-oriented to one another and having dimensions of 16 by 40 inches.

An additional blade or blades similar to 106 could be employed to vary the length dimension desired in the pads.

However, one of the most important features of the present invention is the automatic orientation of adjacently disposed sets of pads with their long axis disposed perpendicular to one another. This drammatically simplfies and facilitates the handling of the individual pads so formed to greatly enhance automatic stacking and reduce cost of manufacture as well as manual labor presently necessary in prior art equipment.

As the sod strips passed between the respective blades 106 or 108 and drum 78, the severed pads move off of drum 78 onto a chute 114 mounted on frame 20 adjacent to drum 78.

Chute 114 extends rearwardly and downwardly preferably toward a pick-up and conveying mechanism for further automated handling. Any suitable pick-up conveying means may be used advantageously with the severing means of the present invention, such as a chain conveyor indicated generally at 116, diagrammatically illustrated in FIG. 4.

Since the particular form of pick-up or conveying means is independent from the severing means of the present invention, and many forms of conventional means could be used, a detailed description will not be given here.

Briefly, conveying means 116 includes a plurality of endless flexible roller chains 118 which are disposed in spaced parallel relationship to one another and operatively mounted on sprockets 120 and 122. Forwardly disposed sprockets 120 mounted at each end of a shaft 124 which is journalled on the frame at a position above the rear edge of chute 114. Sprockets 122 are similarly journalled to frame 20. The lower run of each chain 118 is located at a horizontal position slightly elevated above the bottom of chute 114.

Each chain 118 may carry a plurality of rigidly fixed teeth or pick-up members 124 at equal intervals. Other forms of pick-up members may be utilized equally well.

Using this particular construction, the teeth on the curved portion of the chains moving around sprockets 120 diverge from one another as they extend outwardly away from the chain. The outer tips of adjacent teeth 124 thus move closer together as the chain portion on which they are carried moves from the curved portion of the sprocket to the straight lower run of the chain.

As a sod pad moves down chute 114, teeth 124 located on the downward side of sprocket 120 engage the pad and pull it rearwardly. As the teeth begin their straight run, the convergence described above function to pinch the sod between adjacent teeth and carry the pad rearwardly.

A stripping mechanism, indicated generally at 125 comprising a plurality of bars or the like mounted between each chain 118 and movable mounted to strike the sod when actuated downwardly can be utilized to cause each pad to fall from the chain conveyor to a collecting pallet such as at 126. Other means conventional or otherwise may be employed quite easily to advantageously handle the sod pads already oriented as described herein upon being severed without departing from the spirit of the present invention.

As seen in FIG. 1, a sod box 128 may be mounted on frame 20 below the conveyer means 116. A pallet elevator 130 to receive a wooden pallet 126 and successively lower the pallet as sod pads are deposited is conventional. Located to the rear of sod box 128, a pallet rack 132 may be mounted for carrying a stack of pallets and may include a pallet loading mechanism if fully automated operation is desired.

In operation, the apparatus is propelled along the ground with the cutter head assembly 28 lowered to a depth to separate a continuous elongated strip of sod of a predetermined thickness from the ground.

The strip of sod is then delivered upwardly via chains 66 and elevator assembly 30 to a severing area defined by severing means 100. The unique construction of the rotating blade means automatically severs individual pads of sod having preselected configurations and dimensions and also orients each set of pads such that alternate side by side sets of pads are cross-wise orientated relative to their length.

In this manner, the individual pads of sod may be easily handled by automated pick-up conveying means such as 116 and automatically deposited on a pallet such as at 94 in a very easy fashion compared to prior art methods and means.

From the foregoing description, it should be understood that the present invention represents a drammatically improved solution to the problems involved in automating sod harvesting equipment and is an important and very significant construction to the art.

What is claimed is:

1. Severing means for forming and orienting pads of sod comprising, in combination, means for presenting a strip of sod to a severing station; a first blade means disposed at said severing station and aligned to sever said strip of sod transversely to the direction of relative travel of said sod past said blade means at predetermined longitudinally spaced intervals; a second blade means mounted adjacent to said first blade means relative to the path of travel of said strip of sod and aligned to sever certain portions of said strip of sod longitudinally relative to the direction of travel of said sod strip past said blade means at predetermined spaced intervals and cooperating with said first blade means to form individual sod pads from said strip of sod having preselected lengths and widths with certain of said individual sod pads being automatically oriented with their long axis at substantially right angles relative to the long axis of certain other of said sod pads formed by said first blade means.

2. The severing means defined in claim 1 wherein said first blade means includes a plurality of blades and said second blade means and at least one of said first blade means are mounted on a rotary carrier.

3. The severing means defined in claim 2 wherein said rotary carrier has a generally cylindrical shaped configuration carrying at least one blade means extending parallel to the axis of said carrier and at least one blade means extending circumferentially around at least a portion of said carrier.

4. The severing means defined in claim 3 wherein said first blade means includes a plurality of blades circumferentially spaced from one another at predetermined intervals and said second blade means extends circumferentially between at least an adjacent pair of said blades of said first blade means.

5. The severing means defined in claim 1 wherein individual sod pads formed in sets comprising a plurality of individual pads similarly aligned with one another and wherein adjacently disposed sets are oriented at substantially right angles to one another relative to the length dimension of the individual pads.

6. In an apparatus for harvesting sod, the combination of a portable frame means adapted for movement over a field of sod; cutting means mounted on said frame means and adapted to separate a strip of sod from the ground; conveying means mounted on said frame means adjacent to said cutting means for carrying said strip of sod rearwardly; severing means mounted on said frame means adjacent to said conveying means for severing said continuous strip of sod in a manner to form sod pads of relatively uniform length and width, said severing means including a rotary knife means including a plurality of blades extending transversely to the direction of travel of said strip of sod and at least one blade disposed between two of said transverse blades and extending longitudinally relative to the direction of travel of said strip of sod; and means for receiving and discharging said sod pads severed by said knife means.

7. An improved sod severing means for automatic sod harvesting apparatus having cutting means for separating a strip of sod from the ground; the improvement comprising means for causing relative movement of the sod to be harvested toward a severing means, said severing means including transversely extending blade means adapted to make transverse cuts at predetermined longitudinally spaced intervals into the strip of sod being harvested, and at least one longitudinally extending blade means disposed adjacent to but spaced from said transversely extending blade means relative to the direction of travel of said strip of sod and adapted to make a longitudinal cut at predetermined intervals into said strip of sod being harvested; wherein a plurality of individual pads of sod are formed having relatively uniform widths and lengths, certain of said pads being cut by said longitudinally extending blade means and being automatically oriented lengthwise relatively to the disposition of those pads solely formed by said transversely extending blade means.

8. In an apparatus for automatically harvesting sod of the type presenting a strip of sod to a severing means to form individual pads of sod of selected length and width, the combination of a rotary mounted severing means including a generally cylindrically shaped carrier means provided with a plurality of spaced axially extending and outwardly projecting blade means and at least one circumferentially extending blade means disposed between at least two of said axially extending blade means, wherein a plurality of individual pads of relatively uniform length and width are formed upon one complete revolution of said rotary severing means with certain of said pads being automatically oriented with their longitudinal axis at substantially right angles relative to the longitudinal axis of certain other of the pads so formed during said one complete revolution of said severing means.

9. An improved sod harvesting apparatus of the type provided with means for separating an elongated strip of sod from the ground for delivery to a severing means for forming individual sod pads and means for stacking the formed pads onto pallets or the like; the improvement comprising severing means having first and second blade means adapted to selectively cut said strip of sod into individual sod pads of predetermined length and width with certain of said pads being automatically oriented with their long axis at generally right angles relative to the direction of travel of said strip of sod and other of said pads having their long axis automatically oriented parallel to the direction of travel of said strip of sod to facilitate the collecting and stacking of said sod pads onto said pallets.

10. The apparatus defined in claim 9 wherein said severing means includes a cylindrical-shaped carrier provided with a plurality of axially extending blade means circumferentially spaced from one another and at least one circumferentially extending blade means disposed between an adjacent pair of said axially extending blade means.

11. The apparatus defined in claim 10 wherein said circumference described by said blade means upon one complete rotation of said carrier is substantially equal to approximately twice the preselected length dimension of the individual pads of sod formed.

* * * * *